United States Patent Office 3,211,739
Patented Oct. 12, 1965

3,211,739
4-OXO-TETRAHYDRONAPHTHALENE-1-
CARBOXYLIC ACID AMIDES
Karl Schenker and Ernst Sury, Basel, Switzerland,
assignors to Ciba Corporation, a corporation of
Delaware
No Drawing. Filed Nov. 4, 1960, Ser. No. 66,925
Claims priority, application Switzerland, Nov. 12, 1959,
80,495/59; Aug. 30, 1960, 9,789/60
15 Claims. (Cl. 260—294.7)

The present invention relates to new naphthalene compounds, more particularly to 4-oxo-1:2:3:4-tetrahydronaphthalene-1-carboxylic acid amides and, if desired, of their salts.

The new compounds may be further substituted, for example in 1-position by hydrocarbon radicals which may be unsubstituted or substituted. Such radicals, are, above all, lower alkyl such as methyl or ethyl groups, unbranched or branced propyql, butyl or pentyl groups. alkenyl such as allyl groups, cycloalkyl, cycloalkenyl, such as cyclopentyl or cyclohexenyl radicals, cycloalkyl-alkyl such as cyclohexylmethyl, aryl or aralkyl such as phenylalkyl groups, e.g. phenyl, tolyl or benzyl groups. Suitable substituents in these hydrocarbon radicals with regard to the alkyl radical are, above all, halogen atoms, free or substituted hydroxyl, mercapto or amino groups; substituents in the latter groups are, more especially, lower alkyl groups, or in the case of the amino groups also alkylene groups such, for example as methyl, ethyl, propyl, butyl, butylene-1:4, pentylene-1:5, hexylene-2:5, and the last-mentioned may be interrupted by hetero atoms such as oxygen, nitrogen or sulfur, being for example, a 3-oxa- or aza-pentylene-1:5-radical. As substituents in the aromatic radicals may be mentioned halogen atoms, such as chlorine or bromine, free or substituted hydroxyl, mercapto or amino groups, such as lower alkoxy, alkylmercapto, alkylamino or dialkylamino groups, e.g. methoxy, ethoxy, methyl-mercapto, methylenedioxy- or dimethylamino groups, the nitro group, lower alkyl such as methyl, ethyl, propyl or butyl groups, or halogenoalkyl groups such as trifluoromethyl.

In positions 2 and/or 3 the new compounds may contain alkyl groups such, for example, as the methyl group. Furthermore, the aromatic nucleus of the tetrahydronaphthalene may contain substituents, above all those mentioned above as suitable for the aryl radicals.

The amide group in the new compounds is preferably unsubstituted, but it may also be N-substituted, for example, like the above-mentioned amino groups. More especially, it may be, for example, a monoalkylamide or dialkylamide such as an ethylamide or diethylamide group, an alkylene-amide, aza-alkylene-amide or oxa-alkylene-amide group, a mono- or di-cycloalkylamide group or an N-alkyl-N-cycloalkyl-amide group.

The new compounds possess valuable pharmacological properties. Above all they have a tranquilizing effect on the central nervous system, such as sedative and anticonvulsive properties, and can therefore be used as medicaments in human or veterinary medicine, though they are also useful intermediates for the manufacture of medicaments.

Of special value are the 1-unsubstituted- or 1-lower alkyl - 4-oxo-1:2:3:4-tetrahydronaphthalene-1-carboxylic acid amides and in which the amide-nitrogen atom is unsubstituted or mono- or di-lower alkylated, above all those of the formulae

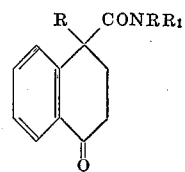

and

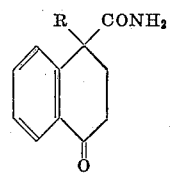

in which R represents a hydrogen atom or a lower alkyl radical and $R_1$ a lower alkyl radical, and more especially the 1-methyl-4-oxo-1:2:3:4-tetrahydronaphthalene-1-carboxylic acid amide and primarily the 1-ethyl-4-oxo-1:2:3:4-tetrahydronaphthalene - 1 - carboxylic acid amide.

The new tetrahydronaphthalene compounds are obtained when in a 4-oxo-1:2:3:4-tetrahydronaphthalene-1-carboxylic acid, or in a reactive functional acid derivative thereof, the free or converted carboxyl group is transformed into an acid amide group.

According to an advantageous method the acid, or a reactive derivative thereof containing an oxo group in the converted carboxyl group, is reacted with ammonia or with an amine containing hydrogen, and a resulting ammonium salt is dehydrated. Suitable reactive derivatives of the acid are, above all, activated esters, e.g. esters with alcohols containing an electron-attracting residue, such as cyanomethyl alcohol, or esters of readily volatile alcohols such as methanol or ethanol, acid halides such as chlorides, or acid anhydrides.

The reaction is carried out in the usual manner, preferably in the presence of a condensing agent capable of splitting off water, alcohol or acid.

Another suitable starting material is the acid nitrile, which is hydrolyzed to form the amide in the usual manner, for example with the aid of a hydrolyzing acid, such as sulfuric acid.

Under another modification of the process of making the new compounds γ-phenyl-γ-carbamyl-butyric acids or their reactive acid derivatives containing an oxo group, primarily the esters or the amide are cyclicized to form 1-carbamyl-4-oxo-1,2,3,4-tetrahydronaphthalenes with the use of 100% sulfuric acid as condensing agent. The reaction is performed at an elevated temperature or preferably at room temperature but for a longer period of time. In such reactions the butyric acid used as starting material may of course be further substituted, e.g. alkylated, in a manner suitable for the end products especially in γ-position.

When the new compound contains a basic amino group it can be obtained in the form of the free base or of a salt thereof which can be converted each into the other in the usual manner. Salt-forming acids are, above all, those which form therapeutically useful salts, for example the hydrohalic acids, sulfuric acids, phosphoric acids, nitric acid, perchloric acid; aliphatic, alicyclic, aromatic or heterocyclic carboxylic or sulfonic acids, such as formic, acetic, propionic, oxalic, succinic, glycolic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, salicylic or para-aminosalicylic acid; methanesulfonic, ethanesulfonic, hydroxyethanesulfonic, ethylenesulfonic acid; toluenesulfonic, naphthalenesulfonic acids or sulfanilic acid, methionine, tryptophan, lysine, cysteine, arginine or glutamic acid.

The invention further includes any variant of the present process in which an intermediate obtained at any stage thereof is used as starting material, and the remaining step or steps is/are carried out, or the process is discontinued at any stage thereof, or in which a starting material, such as the 1-acid nitrile, is formed in the course of a reaction.

For example, there is used as starting material γ-phenyl-γ-cyano-butyric acid or a reactive acid derivative thereof containing an oxo group, especially an ester or amide, and the 4-oxo-1,2,3,4-tetrahydronaphthalene ring is closed with the use of 100% sulfuric acid, the nitrile group in 1-position being saponified to form the amide group. In such reactions the butyric acid used as starting material may of course be further substituted, e.g. alkylated, in a manner suitable for the end products, especially in γ-position.

The starting materials are known or can be prepared by known methods. It is of advantage to use a starting material that yields one of the final products referred to above as being especially valuable.

The new compounds, if desired their salts, or suitable mixtures thereof, can be used, for example in the form of pharmaceutical preparations containing the afore-mentioned compounds in admixture with an organic or inorganic pharmaceutical excipient suitable for enteral or parenteral administration. Suitable excipients are substances that do not react with the compounds described, such as water, gelatine, lactose, starches, magnesium stearate, talc, vegetable oils, benzyl alcohols, gums, polyalkylene glycols, cholesterol or other known medicinal excipients. The pharmaceutical preparations may be, for example, tablets or dragées or in liquid form solutions, suspensions or emulsions. They may be sterilized and/or may contain assistants such as preserving, stabilizing, wetting or emulsifying agents. They may also contain other therapeutically useful substances. The preparations are formulated by the conventional methods. They contain for example about 5–60% of active substance or 50–200 mg. per dosage unit.

The following examples illustrate the invention.

Example 1

20.3 grams (0.1 mol) of γ-phenyl-γ-cyanovaleric acid are added with shaking to 30 cc. of sulfuric acid of 100% strength, and the whole is then heated for 1 hour on a boiling waterbath with exclusion of moisture. The clear fluorescent solution is cooled and poured over 150 grams of ice. On trituration, the 1-methyl-4-oxo-1:2:3:4-tetrahydronaphthalene-1-carboxylic acid amide of the formula

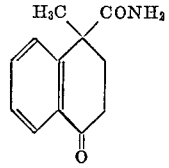

crystallizes; it is suctioned off, copiously washed with water and recrystallized from aqueous ethanol. It forms colorless crystals melting at 192–193° C.

The γ-phenyl-γ-cyanovaleric acid used as starting material is prepared in the following manner:

A mixture of 131 grams (1 mol) of α-phenyl-propionitrile and 125 grams (1.25 mols) of ethyl acrylate is cautiously treated dropwise with 5 cc. of "Triton B" (solution of 40% strength of benzyl-trimethyl-ammonium hydroxide in tertiary butanol). When the strongly exothermic reaction has subsided, another 5 cc. of "Triton B" are added, and the whole is heated for 3 hours on a water-bath, cooled, taken up in 300 cc. of chloroform, and the catalyst base is removed by 3 extractions with 50 cc. each of water and dried over sodium sulfate. The solvent is distilled off and the residue is distilled in a high vacuum, to yield γ-phenyl-γ-cyanovaleric acid ethyl ester as a colorless oil boiling at 113–115° C. under 0.03 mm. Hg pressure.

A solution of 115.5 grams (0.5 mol) of this ester in 150 cc. of ethanol is shaken with 275 cc. of 2 N-sodium hydroxide solution (0.55 mol) until the addition of water no longer produces turbidity (about 1 hour). While cooling, the reaction mixture is then treated with 300 cc. of 2 N-hydrochloric acid, and the product precipitating as an oil is extracted with chloroform, to yield γ-phenyl-γ-cyanovaleric acid as a colorless, highly viscous oil which on trituration with benzene crystallizes in coarse prisms melting at 75–77° C.

Example 2

21.7 grams (0.1 mol) of γ-phenyl-γ-cyanocaproic acid in 70 cc. of sulfuric acid of 100% strength are heated and, as described in Example 1, worked up to yield the 1-ethyl-4-oxo-1:2:3:4-tetrahydronaphthalene-1-carboxylic acid amide of the formula

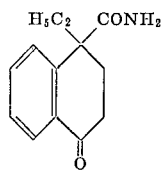

which is obtaned from ethyl acetate in colorless crystals melting at 149–150° C.

The acid used as starting material is prepared thus:

145 grams (1 mol) of α-phenyl-butyronitrile are reacted as described in Example 1 with 125 grams (1.25 mols) of ethyl acrylate in the presence of 10 cc. of "Triton B," to yield the γ-phenyl-γ-cyanocaproic acid ethyl ester as a colorless liquid boiling at 115–117° C. under 0.04 mm. Hg pressure. When 122.5 grams (0.5 mol) of this ester are hydrolyzed with 275 cc. of 2 N-sodium hydroxide solution (0.55 mol), there is obtained the γ-phenyl-γ-cyanocaproic acid which, after recrystallization from aqueous ethanol, forms colorless crystals melting at 90–91° C.

Example 3

10 grams of (0.05 mol) of 1-ethyl-1-cyano-4-oxo-1:2:3:4-tetrahydronaphthalene are added in portions to 30 cc. of sulfuric acid of 94% strength, and the mixture is kept for 24 hours at 25° C. The clear, dark-colored solution is poured over ice, and the precipitated oil is extracted with chloroform. Evaporation of the solvent yields 1-ethyl-4-oxo-1:2:3:4-tetrahydronaphthalene-1-carboxylic acid amide of the formula

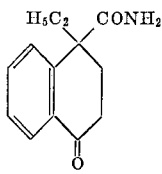

which, after having been recrystallized twice from ethyl acetate, melts at 149–150° C. and is in every respect identical with the product obtained as described in Example 2.

The 1-ethyl-1-cyano-4-oxo-1:2:3:4-tetrahydronaphthalene used as starting material may be prepared in the following manner:

A suspension of 80 grams (0.5 mol) of anhydrous aluminum chloride in 300 cc. of dry carbon disulfide is slowly treated with stirring at 20° C. dropwise with a solution of 94 grams of γ-phenyl-γ-cyanocaproic acid chloride (0.4 mol) in 100 cc. of carbon disulfide, with the temperature of the reaction mixture rising to 33° C. The mixture is stirred for 1 hour, poured into ice water, and the oily phase is extracted with ether; the ethereal solution is washed 3 times with water, then with sodium carbonate solution, and then again with water, dried over calcium chloride and finally the ether is distilled off. The crystalline residue is distilled in a high vacuum, to yield 1-ethyl-1-cyano-4-oxo-1:2:3:4-tetrahydronaphthalene of the formula

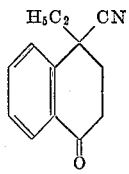

which spontaneously solidifies in crystalline form. It boils at 141–145° C. under 0.08 mm. Hg pressure. On recrystallization from ether+petroleum ether it forms colorless crystals melting at 72° C.

The γ-phenyl-γ-cyanocaproyl chloride used as starting material in the above reaction is obtained by treating the acid concerned with thionyl chloride.

The above-mentioned 1-ethyl-4-oxo-1:2:3:4-tetrahydronaphthalene-1-carboxylic acid amine can alternatively be prepared by treating 1-ethyl-4-oxo-1:2:3:4-tetrahydronaphthalene-1-carboxylic acid methyl ester with ammonia. The methyl ester used in this reaction is prepared thus:

A solution of 249 grams (0.97 mol) of α-phenyl-α-ethyl-glutaric acid monomethyl ester monochloride in 500 cc. of anhydrous carbon disulfide is slowly treated at 20° C., with stirring, dropwise with 290 grams of tin tetrachloride (1.13 mols), with the temperature of the reaction mixture rising to 38° C. The reaction mixture is stirred on for 1 hour, poured into ice water and further worked up as described above.

On distillation, a fraction is obtained which boils at 130–140° C. under 0.08 mg. Hg pressure and consists of the 1-ethyl-4-oxo-1:2:3:4-tetrahydronaphthalene-1-carboxylic acid methyl ester of the formula

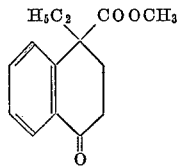

*Example 4*

When 23.1 grams (0.1 mol) of γ-phenyl-γ-cyanoenanthic acid in 70 cc. of sulfuric acid of 100% strength are heated and worked up as described in Example 1, there results the 1-n-propyl-4-oxo-1:2:3:4-tetrahydronaphthalene-1-carboxylic acid amide of the formula

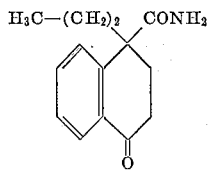

which, on recrystallization from aqueous ethanol, forms colorless crystals melting at 137–138° C.

The γ-phenyl-γ-cyanoenanthic acid used for the ring closure is prepared in the following manner:

159 grams (1 mol) of α-phenol-valeronitrile are reacted as described in Example 1, in the presence of 10 cc. of "Triton B," with 125 grams (1.25 mols) of ethyl acrylate, to yield the γ-phenyl-γ-cyanoenanthic acid ethyl ester in the form of a colorless oil boiling at 113–115° C. under 0.02 mm. Hg pressure.

129.5 grams (0.5 mol) of this ester are hydrolyzed with 275 cc. of 2 N-sodium hydroxide solution (0.55 mol), to yield γ-phenyl-γ-cyanoenanthic acid as a viscous oil which is subjected to the cyclization with sulfuric acid without any processing.

*Example 5*

By the method described in Example 1, heating for 1 hour of 24.5 grams (0.1 mol) of γ-phenyl-γ-cyanocaprylic acid with 70 cc. of sulfuric acid of 100% strength on a waterbath yields the 1-n-butyl-4-oxo-1:2:3:4-tetrahydronaphthalene-1-carboxylic acid amide of the formula

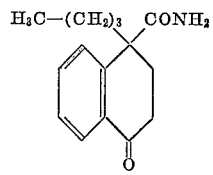

in the form of colorless crystals which melt at 118–119° C. after recrystallization from ethyl acetate+petroleum ether and subsequent sublimation at 170° C. under a pressure of 0.05 mm. Hg.

The γ-phenyl-γ-cyanocaprylic acid is prepared in the following manner:

When 173 grams (1 mol) of α-phenyl-capronitrile and 125 grams (1.25 mols) of ethyl acrylate are reacted as described in Example 1 there results the γ-phenyl-γ-cyanocaprylic acid ethyl ester which forms a colorless liquid boiling at 125–132° C. under 0.06 mm. Hg pressure. When 136.5 grams (0.5 mol) of this ester are hydrolyzed with 275 cc. of 2 N-sodium hydroxide solution (0.55 mol), the γ-phenyl-γ-cyanocaprylic acid is obtained as a viscous oil which can be further worked up as it is.

*Example 6*

Cyclization as described in Example 1 of 25.2 grams (0.1 mol) of γ-(para-chlorophenyl)-γ-cyanocaproic acid with 70 cc. of sulfuric acid of 100% strength yields the 1-ethyl-4-oxo-6-chloro-1:2:3:4-tetrahydronaphthalene-1-carboxylic acid amide of the formula

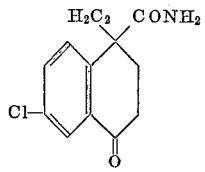

in colorless crystals which melt at 102–103° C. after recrystallization from ethanol.

The acid used as starting material can be prepared thus:

A mixture of 180 grams (1 mol) of α-(para-chlorophenyl)-butyronitrile, 10 cc. of "Triton B" and 125 grams (1.25 mols) of ethyl acrylate is heated for 3 hours at 100° C. and then worked up as described in Example 1, to yield the γ-(para-chlorophenyl)-γ-cyanocaproic acid ethyl ester as a pale-yellow oil boiling at 132–134° C. under 0.1 mm. Hg pressure.

When 140 grams (0.5 mol) of this ester are hydrolyzed with 275 cc. of 2 N-sodium hydroxide solution (0.55 mol), there results the γ-(para-chlorophenyl)-γ-cyanocaproic acid in the form of colorless crystals which melt at 96–98° C. after recrystallization from aqueous ethanol.

*Example 7*

A suspension of 10.1 grams (0.053 mol) of 4-oxo-1:2:3:4-tetrahydronaphthalene-1-carboxylic acid in 50 cc. of anhydrous ether is slowly treated with 20 grams (0.157 mol) of oxalyl chloride. The mixture is stirred until a clear solution is formed which is then kept overnight. The ether and the excess oxalyl chloride are evaporated, and the residue is dissolved in 50 cc. of absolute benzene and evaporated in a water-jet vacuum. This operation is repeated twice more to remove the last remnants of oxalyl chloride. Finally, while being cooled with ice, the residue which consists of 4-oxo-1:2:3:4-tetrahydro - naphthalene-1-carboxylic acid chloride is treated dropwise with a solution of 15 grams (0.33 mol) of dimethylamine in 50 cc. of benzene, heated for 30 minutes at 50° C., cooled, and treated with dilute ammonia. On evaporation, the benzolic solution yields the 4-oxo-1:2:3:4 - tetrahydronaphthalene-1-carboxylic acid dimethyl amide of the formula

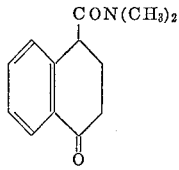

The product forms colorless crystals melting at 85° C. after having been recrystallized from ethyl acetate+ether and then sublimed in a high vacuum.

The 1-methyl-4-oxo-1:2:3:4 - tetrahydronaphthalene-1-carboxylic acid used as starting material is prepared thus:

A solution of 20.3 grams (0.1 mol) of 1-methyl-4-oxo-1:2:3:4-tetrahydronaphthalene-1-carboxylic acid amide (prepared as described in Example 1) in 50 cc. of glacial acetic acid is treated with 100 cc. of concentrated hydrochloric acid and refluxed for 16 hours, cooled, and the solution is decolorized with active carbon and evaporated in a water-jet vacuum. The crystalline residue is disintegrated, thoroughly shaken with 150 cc. of water and suctioned off. The acid obtained in this manner melts at 116–117° C. after having been recrystallized once from ethyl acetate+ether.

Example 8

As described in Example 7, 10.1 grams (0.053 mol) of 4-oxo-1:2:3:4-tetrahydronaphthalene-1-carboxylic acid are treated with 20 grams (0.67 mol) of oxalyl chloride, and the resulting acid chloride is dissolved in benzene and cautiously treated with 24.4 grams (0.33 mol) of diethylamine. Addition of aqueous ammonia yields the 4-oxo-1:2:3:4-tetrahydronaphthalene - 1 - carboxylic acid diethylamide of the formula

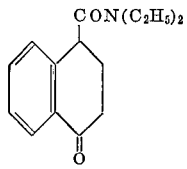

After having been recrystallized from ether and then sublimed in a high vacuum it forms colorless cubes melting at 96° C.

Example 9

When the 4-oxo-1:2:3:4-tetrahydronaphthalene-1-carboxylic acid chloride obtained in Example 7 is reacted with 19.6 grams (0.33 mol) of isopropylamine, there is obtained the 4-oxo-1:2:3:4-tetrahydronaphthalene-1-carboxylic acid isopropylamide of the formula

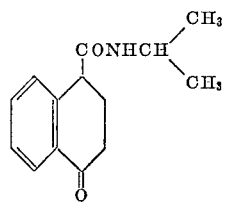

in the form of colorless crystals melting at 156° C.

Example 10

10.2 grams (0.05 mol) of 1-methyl-4-oxo-1:2:3:4-tetrahydronaphthalene-1-carboxylic acid are reacted with 20 grams (0.157 mol) of oxalyl chloride, and the acid chloride formed is then reacted with 15 grams (0.33 mol) of dimethylamine by the process described in Example 7, to yield the 1-methyl-4-oxo-1:2:3:4-tetrahydronaphthalene-1-carboxylic acid dimethylamide of the formula

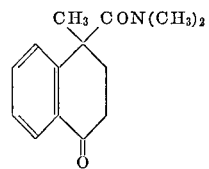

which forms magnificent prisms melting at 96° C. after recrystallization from ether and sublimation in a high vaccum.

Example 11

10 g. (0.078 mol) of oxalyl chloride are added to 10.9 g. (0.05 mil) of 1-ethyl-4-oxo-1:2:3:4-tetrahydronaphthalene1-1carboxylic acid in 40 cc. of anhydrous ether. The reaction mass is refluxed for 6 hours, allowed to stand for 2 days at 25° C. and worked up by the method shown in Example 7. In a manner analogous to that of Example 7, the resulting acid chloride is caused to react with 12.6 g. (0.15 mol) of piperidine in benzene. The benzene solution is extracted twice by shaking with 50 cc. of 2 N-hydrochloric acid each time, twice with 50 cc. of 2 N-sodium hydroxide solution each time, and finally with two 50 cc.-portions of water. The resulting 1-ethyl-4-oxo-1:2:3:4 - tetrahydronaphthalene-1-carboxylic acid piperidide of the formula

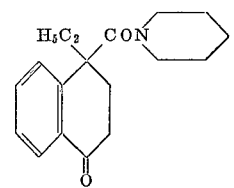

after being recrystallized from a mixture of ether and petroleum ether forms pale yellow cubes of melting point 87° C.

The 1-ethyl-4-oxo-1:2:3:4 - tetrahydro - naphthalene-1-carboxylic acid is prepared as follows:

21.7 g. (0.1 mol) of 1-ethyl-4-oxo-1:2:3:4-tetrahydronaphthalene-1-carboxylic acid amide, the preparation of which is described in Examples 2 and 3, are dissolved in 75 cc. of glacial acetic acid and, after the addition of 150 cc. of concentrated hydrochloric acid, refluxed for 16 hours. After cooling, the solution is decolorized with active carbon and evaporated under a water-jet vacuum. The residue is dissolved in chloroform, washed with water, the chloroformic solution dried over sodium sulfate, and the solvent distilled off. The resulting acid melts at 102–103° C. after being recrystallized from a mixture of benzeen and petroleum ether.

Example 12

23.1 g. (0.1 mol) of γ-phenyl-γ-cyano-δ-methyl-caproic acid are introduced in portions, while cooling with ice, into 70 cc. of 100% sulfuric acid and allowed to stand for 110 hours at 10° C. The clear solution is then slowly poured onto 200 g. of ice, and the precipitated product extracted with chloroform. There is obtained the 1-isopropyl-4-oxo-1:2:3:4 - tetrahydronaphthalene - 1-carboxylic acid amide of the formula

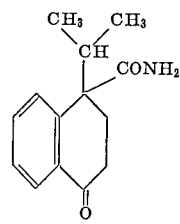

which on being recrystallized forms colorless prisms of melting point 156° C.

The acid used as starting material can be prepared as follows:

Following the procedure described in Example 1, 159 g. (1 mol) of α-phenyl-β-methyl-butyronitrile are caused to react with 125 g. (1.25 mols) of acrylic acid ethyl ester in the presence of 10 cc. of "Triton B" to obtain the γ-phenyl-γ-cyano-δ-methyl-caproic acid ethyl ester, a colorless liquid boiling at 110–114° C. under a pressure of 0.02 mm. of Hg. 129.5 g. (0.5 mol) of this ester are saponified with 275 cc. of 2 N-sodium hydroxide solution (0.55 mol) to yield the γ-phenyl-γ-cyano-δ-methyl-caproic acid which crystallizes from a mixture of benzene and petroleum ether in the form of colorless scales of melting point 83–84° C.

*Example 13*

In the manner described in Example 1, 24.7 g. (0.1 mol) of γ-(m-methoxyphenyl)-γ-cyano-caproic acid are cyclicized with 100 cc. of 100% sulfuric acid and worked up in an analogous manner to obtain 1-ethyl-4-oxo-7-methoxy-1:2:3:4-tetrahydronaphthalene-1-carboxylic acid amide of the formula

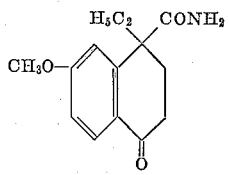

The amide crystallizes from a mixture of ethyl acetate and ether in colorless cubes of melting point 160° C.

The acid used as starting material is prepared as follows:

In the presence of 10 cc. of "Triton B," 175 g. (1 mol) of α-(m-methoxyphenyl)-butyronitrile are heated to 100° C. for 3 hours with 125 g. (1 mol) of acrylic acid ethyl ester, and the product worked up by the procedure described in Example 1. The resulting γ-(m-methoxyphenyl)-γ-cyano-caproic acid ethyl ester is a colorless oil boiling at 130–132° C. under a pressure of 0.08 mm. of Hg.

When 110 g. (0.4 mol) of this ester are saponified with 225 cc. of 2 N-sodium hydroxide solution (0.45 mol) there is obtained the γ-(m-methoxyphenyl)-γ-cyano-caproic acid in the form of colorless crystals melting at 88° C.

*Example 14*

When 23.1 g. (0.1 mol) of α-methyl-γ-phenyl-γ-cyano-caproic acid are treated with 70 cc. of 100% sulfuric acid in the manner described in Example 1, there is obtained on working up in analogous manner the 1-ethyl-3-methyl-4-oxo-1:2:3:4-tetrahydro-naphthalene-1-carboxylic acid amide of the formula

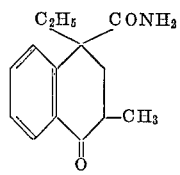

in the form of colorless crystals which, after being recrystallized several times from ethanol, melt at 192° C.

The acid used as starting material can be prepared as follows:

In the presence of 15 cc. of "Triton B," 145 g. (1 mol) of α-phenyl-butyronitrile are heated to 100° C. for 3 hours with 125.5 (1.1 mols) of methacrylic acid ethyl ester. The resulting α-methyl-γ-phenyl-γ-cyanocaproic acid ethyl ester which forms is worked up as described in Example 1. It is a colorless liquid which boils at 98–103° C. under a pressure of 0.05 mm. of Hg. When 129.5 g. (0.5 mol) of this ester are treated with 275 cc. of 2 N-sodium hydroxide solution (0.55 mol), the α-methyl-γ-phenyl-γ-cyano-caproic acid is obtained which, after being recrystallized from a mixture of ether and petroleum ether, melts at 78–85° C.

*Example 15*

12.25 g. (0.05 mol) of γ-phenyl-γ-cyano-caproic acid ethyl ester whose preparation is described in Example 2 are stirred, while cooling with ice, into 40 cc. of 100% sulfuric acid, the vessel sealed with cotton, and allowed to stand at 25° C. for 110 hours. The clear, pale brown solution is then poured onto 150 g. of ice and extracted with chloroform. The resulting oil is recrystallized from isopropanol to yield the 1-ethyl-4-oxo-1:2:3:4-tetrahydronaphthalene-1-carboxylic acid amide of the formula

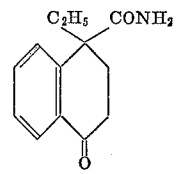

of melting point 149–150° C. which is identical with the product of Examples 2 and 3 in every respect.

*Example 16*

When 11.75 g. (0.05 mol) of γ-phenyl-γ-carbamyl-caproic acid are introduced slowly, while cooling with ice, into 40 cc. of 100% sulfuric acid, and the solution allowed to stand at 25° C. for 110 hours, the vessel being sealed with cotton, before it is worked up in the manner described in Example 15, there is obtained the 1-ethyl-4-oxo-1:2:3:4-tetrahydronaphthalene-1-carboxylic acid amide of the formula

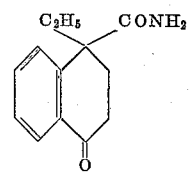

After recrystallization from isopropanol, the compound forms colorless crystals of melting point 149–150° C. This amide is identical in every respect with that described in Examples 2, 3 and 15.

The γ-phenyl-γ-carbamyl-caproic acid used as starting material is prepared by hydrolyzing the corresponding cyano-acid with dilute alkali; it melts at 153° C.

*Example 17*

Regular compressed tablets containing 200 mg. of the active substance.

| Composition: | Mg. |
|---|---|
| 1-ethyl-4-oxo-1,2,3,4-tetrahydronaphthalene-1-carboxylic acid amide | 200.0 |
| Lactose | 100.0 |
| Colloidal aluminum hydroxide | 105.0 |
| Wheat starch | 51.0 |
| Colloidal silicic acid with hydrolyzed starch | 20.0 |
| Stearic acid | 9.0 |
| Talcum | 15.0 |
| | 500.0 |

A mixture of the acid amide with lactose, colloidal aluminum hydroxide and colloidal silicic acid with hydrolyzed starch is granulated in the usual manner with an aqueous wheat starch gel, dried, admixed with the usual auxiliaries, and compressed into tablets of 500 mg. each.

What is claimed is:
1. A compound of the formula

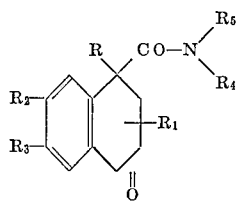

in which R stands for a member selected from the group consisting of hydrogen, lower alkyl, lower alkenyl, cyclopentyl, cyclohexyl, cyclohexylmethyl, phenyl, phenyl-lower alkyl and tolyl, $R_1$ stands for a member selected from the group consisting of hydrogen and lower alkyl, $R_2$ and $R_3$ each stands for a member selected from the group consisting of hydrogen, lower alkyl, hydroxy, lower alkoxy, mercapto, lower alkylmercapto, amino, mono-lower alkyl-amino, di-lower alkyl-amino, halogen, trifluoromethyl and nitro, $R_4$ and $R_5$ each stands for a member selected from the group consisting of hydrogen, lower alkyl, cyclo-lower alkyl, and, when taken together, lower alkylene, lower oxa-alkylene and lower aza-alkylene.

2. 4 - oxo - 1:2:3:4-tetrahydronaphthalene-1-carboxylic acid amides of the formula

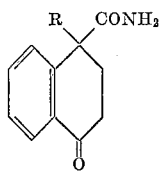

wherein R stands for lower alkyl.

3. 1 - methyl - 4 - oxo-1:2:3:4-tetrahydronaphthalene-1-carboxylic acid amide.

4. 1 - ethyl - 4 - oxo-1:2:3:4-tetrahydronaphthalene-1-carboxylic acid amide.

5. 1 - n - propyl-4-oxo-1:2:3:4-tetrahydronaphthalene-1-carboxylic acid amide.

6. 1 - n - butyl-4-oxo-1:2:3:4-tetrahydronaphthalene-1-carboxylic acid amide.

7. 4 - oxo - 1:2:3:4-tetrahydronaphthalene-1-carboxylic acid dimethylamide.

8. 4 - oxo - 1:2:3:4-tetrahydronaphthalene-1-carboxylic acid isopropylamide.

9. 4 - oxo - 1:2:3:4-tetrahydronaphthalene-1-carboxylic acid diethylamide.

10. 1 - methyl - 4 - oxo-1:2:3:4-tetrahydronaphthalene-1-carboxylic acid-dimethylamide.

11. 1 - ethyl - 4 - oxo-6-chloro-1:2:3:4-tetrahydronaphthalene-1-carboxylic acid amide.

12. 1 - ethyl - 4 - oxo-1:2:3:4-tetrahydronaphthalene-carboxylic acid-piperidide.

13. 1 - isopropyl - 4 - oxo-1:2:3:4-tetrahydronaphthalene-1-carboxylic acid amide.

14. 1 - ethyl - 4 - oxo-7-methoxy-1:2:3:4-tetrahydronaphthalene-1-carboxylic acid amide.

15. 1 - ethyl - 3 - methyl - 4 - oxo-1:2:3:4-tetrahydronaphthalene-1-carboxylic acid amide.

References Cited by the Examiner
UNITED STATES PATENTS

| | | | |
|---|---|---|---|
| 2,185,237 | 1/40 | Weijlard et al. | 260—465 |
| 2,212,056 | 8/40 | Tinker et al. | 260—515 |
| 2,290,401 | 7/42 | Witman | 260—515 |
| 2,326,222 | 8/43 | Hopff et al. | 260—465 |
| 2,326,229 | 8/43 | Kharasch et al. | 260—544 |
| 2,541,939 | 2/51 | Rosdahl et al. | 260—544 |
| 2,551,891 | 5/51 | Martin et al. | 260—558 |
| 2,913,483 | 11/59 | Gordon | 260—476 |
| 2,914,555 | 11/59 | Gordon | 260—476 |
| 2,937,204 | 5/60 | Harris et al. | 260—558 |
| 2,948,724 | 8/60 | Sahyun et al. | 260—558 XR |

OTHER REFERENCES

Jarrett et al.: J. Chem. Soc. (London), vol. 47, pages 4052–4 (1955).

Protiva et al.: Chem. Abstracts, vol. 47 pages 8057–8 (1953).

Protiva et al.: Chem. Abstracts, vol. 49, pages 199–200 (1955).

WALTER A. MODANCE, *Primary Examiner.*

IRVING MARCUS, NICHOLAS S. RIZZO, *Examiners.*